(12) United States Patent  
Gamo

(10) Patent No.: US 7,400,867 B2  
(45) Date of Patent: Jul. 15, 2008

(54) RADIO BROADCAST RECEIVER

(75) Inventor: Yoshitsugu Gamo, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 500 days.

(21) Appl. No.: 11/257,753

(22) Filed: Oct. 24, 2005

(65) Prior Publication Data

US 2006/0094379 A1 May 4, 2006

(30) Foreign Application Priority Data

Oct. 28, 2004 (JP) ............................ 2004-314516

(51) Int. Cl.  
*H04B 17/02* (2006.01)

(52) U.S. Cl. ...................... 455/137; 455/138; 455/139; 455/101; 455/273; 455/276.1; 375/134; 375/135; 375/136; 375/137; 375/139

(58) Field of Classification Search ................ 455/137, 455/138, 139, 101, 273, 276.1, 277.2; 375/134, 375/135, 136, 137, 138, 139  
See application file for complete search history.

(56) References Cited

U.S. PATENT DOCUMENTS

| | | | | |
|---|---|---|---|---|
| 5,263,180 A | * | 11/1993 | Hirayama et al. | ............ 455/139 |
| 5,321,580 A | * | 6/1994 | Backstrom et al. | ........... 455/139 |
| 5,539,781 A | * | 7/1996 | Matsuura | ..................... 375/347 |
| 6,029,056 A | | 2/2000 | Kiyanagi et al. | |
| 6,115,591 A | * | 9/2000 | Hwang | .................... 455/277.2 |

* cited by examiner

*Primary Examiner*—Sanh D Phu  
(74) *Attorney, Agent, or Firm*—Brinks Hofer Gilson & Lione

(57) ABSTRACT

A radio broadcast receiver is provided which reduces the degradation in quality of diversity-received signals. When a difference in level between a reception signal of a main antenna and a reception signal of a sub antenna is less than a predetermined threshold value, and when a difference in phase between the reception signal of the main antenna and the reception signal of the sub antenna exceeds another predetermined threshold value, a combination ratio of a combiner for combining outputs of a main tuner and of a sub tuner is set to 1:1, where in-phase combination type diversity is carried out. In other cases, the combination ratio of the combiner is switched between 1:0 and 0:1 depending on the occurrence of a multipath, where selection diversity is carried out.

14 Claims, 4 Drawing Sheets

RADIO BROADCAST RECEIVER

BACKGROUND OF THE INVENTION

1. Field of the Invention

The present invention relates to diversity reception techniques for radio broadcast receivers.

2. Description of the Related Art

The well-known diversity reception techniques for reducing multipath interference or the like in radio broadcast receivers include a selection diversity scheme which selects and uses a signal in a good reception condition from among signals respectively received by a plurality of antennas provided in the receiver, as disclosed in, for example, JP-A-7-283767, and an in-phase combination type diversity scheme which combines in phase a plurality of signals respectively received by the antennas provided in the receiver, as disclosed in, for example, JP-A-5-235812.

The in-phase combination type diversity can generally reduce multipath interference more effectively than the selection diversity. In some cases, however, even the in-phase combination type diversity cannot completely reduce the multipath interference. For example, suppose that two antennas respectively receive two wave signals having passed through different paths at the same level, and that the first wave signal having traversed the first path reaches the two antennas in phase, while the second wave signal having traversed the second path reaches the two antennas at different times by a difference in phase angle X.

FIG. 4($a$) illustrates a relationship between a difference in phase angle X and a distortion ratio of a reception signal received by the in-phase combination type diversity scheme.

As shown in the figure, in the in-phase combination type diversity scheme, when the phase-angle difference X is large, the distortion ratio of the received signal can be reduced to a smaller value, while, when the phase-angle difference X is small, the in-phase combination type diversity scheme does not function effectively, and the distortion ratio cannot be reduced to the smaller value.

FIG. 4($b$) illustrates a relationship between a distortion ratio of a reception signal received by the in-phase combination type diversity scheme, and a level ratio of a reception signal received by the first antenna to that received by the second antenna when the first wave signal having traversed the first path reaches in phase the two antennas, and the second wave signal having traversed the second path reaches the two antennas at different times by a phase-angle difference of 60 degrees. In the in-phase combination type diversity scheme, when the level of the received signal at the first antenna is approximately the same as that of the received signal at the second antenna, the distortion ratio of the received signal can be reduced to a smaller value, but when a difference in level of the received signals between the two antennas is large, the scheme does not function effectively and the distortion ratio cannot be reduced to the smaller value.

Thus, the in-phase combination type diversity scheme has an area of operation where the multipath interference cannot be reduced effectively.

SUMMARY OF THE INVENTION

The present invention has been accomplished so as to solve those problems encountered with the prior art, and it is an object of the invention to provide a radio broadcast receiver for receiving a radio broadcast in an in-phase combination type diversity scheme, and which can prevent degradation in the quality of signals received in a situation where multipath interference may not be reduced effectively by the in-phase combination type diversity scheme.

To solve the above-mentioned problems, in one aspect of the invention, there is provided a radio broadcast receiver for performing diversity reception of a radio broadcast and demodulating a diversity-received signal of the broadcast. The receiver comprises a first antenna, a second antenna, a phase difference detector for detecting a difference in phase between a first reception signal received by the first antenna and a second reception signal received by the second antenna, a first diversity reception section for aligning the first reception signal and the second reception signal in phase and combining these first and second reception signals into a diversity-received signal, a second diversity reception section for selecting as the diversity-received signal one reception signal in a better reception condition from the first and second reception signals, a diversity operation controller for activating the first diversity reception section when the phase difference detected by the phase difference detector is larger than a predetermined level, and for activating the second diversity reception section when the phase difference detected by the phase difference detector is not larger than the predetermined level, and a demodulator for demodulating the diversity-received signal supplied by the first diversity reception section when the first diversity reception section is activated by the diversity operation controller, and for demodulating the diversity-received signal supplied by the second diversity reception section when the second diversity reception section is activated by the diversity operation controller.

Thus, in the radio broadcast receiver according to one aspect of the invention, when the phase difference between the first reception signal received by the first antenna and the second reception signal received by the second antenna is large, the in-phase combination type diversity scheme is carried out. On the other hand, when the phase difference between the first reception signal received by the first antenna and the second reception signal received by the second antenna is small, the selection diversity scheme is carried out. That is, when such a phase difference is smaller than a certain level, the in-phase combination type diversity scheme does not function effectively, but the selection diversity scheme can be carried out to reduce the degradation in quality of the diversity-received signals more than the in-phase combination type diversity scheme. Accordingly, in one aspect of the invention, the radio broadcast receiver, which is adapted to receive a radio broadcast using the in-phase combination type diversity scheme, can reduce the degradation in the quality of the received signals in a situation where the in-phase combination type diversity cannot decrease the multipath interference effectively due to the small phase difference between the two reception signals.

To solve the above-mentioned problems, in another aspect of the invention, there is provided a radio broadcast receiver for performing diversity reception of a radio broadcast and demodulating a diversity-received signal of the broadcast. The receiver comprises a first antenna, a second antenna, a level difference detector for detecting a difference in strength level between a first reception signal received by the first antenna and a second reception signal received by the second antenna, a first diversity reception section for aligning the first reception signal and the second reception signal in phase and combining these first and second signals into a diversity-received signal, a second diversity reception section for selecting as the diversity-received signal one signal in a better reception condition from the first and second reception signals, a diversity operation controller for activating the first diversity reception section when the level difference detected by the level difference detector is smaller than a predetermined level, and for activating the second diversity reception section when the level difference detected by the level difference detector is not smaller than the predetermined level, and a demodulator for demodulating the diversity-received signal supplied by the first diversity reception section when the first diversity reception section is activated by the diversity operation controller, and for demodulating the diversity-received signal supplied by the second diversity reception section when the second diversity reception section is activated by the diversity operation controller.

Thus, in the radio broadcast receiver according to this aspect of the invention, when the strength-level difference between the first reception signal received by the first antenna and the second reception signal received by the second antenna is small, the in-phase combination type diversity scheme is carried out. On the other hand, when the strength-level difference between the first reception signal received by the first antenna and the second reception signal received by the second antenna is large, the selection diversity scheme is carried out. That is, when such a level difference is larger than a certain level, the in-phase combination type diversity scheme does not function effectively, but the selection diversity scheme can be carried out to reduce the degradation in quality of the diversity-received signals more than the in-phase combination type diversity scheme. Accordingly, in this aspect of the invention, the radio broadcast receiver, which is adapted to receive the radio broadcast using the in-phase combination type diversity scheme, can reduce the degradation in the quality of the received signals in a situation where the in-phase combination type diversity scheme cannot decrease the multipath interference effectively due to the large level difference between the two reception signals.

To solve the above-mentioned problems, in a further aspect of the invention, there is provided a radio broadcast receiver for performing diversity reception of a radio broadcast and demodulating a diversity-received signal of the broadcast. The receiver comprises a first antenna, a second antenna, a first tuner for converting a first reception signal received by the first antenna into a first intermediate frequency signal, a second tuner for converting a second reception signal received by the second antenna into a second intermediate frequency signal, an in-phase section for aligning the first intermediate frequency signal and the second intermediate frequency signal in phase, a combiner for combining the first intermediate frequency signal and the second intermediate frequency signal which are aligned in phase by the in-phase section, a demodulator for demodulating the intermediate frequency signal, a phase difference detector for detecting a difference in phase between the first intermediate frequency signal and the second intermediate frequency signal, and a diversity operation controller for causing the demodulator to demodulate the intermediate frequency signal combined by the combiner when the phase difference detected by the phase difference detector is larger than a predetermined level, and for causing the demodulator to demodulate one of the first and second intermediate frequency signals which has a possibility of occurrence of interference smaller than that of the other signal when the phase difference detected by the phase difference detector is not larger than the predetermined level. When one of the first and second intermediate frequency signals having the smaller possibility of the interference occurrence is demodulated, the diversity operation controller causes at least one of the first and second tuners and the demodulator to prevent a problem caused by interference occurring in the first or second reception signal more strongly than when causing the demodulator to demodulate the intermediate frequency signal combined by the combiner.

Thus, in this aspect of the invention, the radio broadcast receiver, which is adapted to receive the radio broadcast using the in-phase combination type diversity scheme, can reduce the degradation in the quality of the received signals in a situation where the multipath interference cannot be decreased effectively due to the small phase difference between the reception signals of the two antennas, by performing the selection diversity scheme. In addition, when performing the in-phase combination type diversity scheme, an extra operation is not needed to prevent a problem caused by interference occurring in the reception signal, and when performing the selection diversity scheme, an appropriate operation can be conducted to prevent the problem caused by interference occurring in the reception signal.

To solve the above-mentioned problems, in a still further aspect of the invention, there is provided a radio broadcast receiver for performing diversity reception of a radio broadcast and demodulating a diversity-received signal of the broadcast. The receiver comprises a first antenna, a second antenna, a first tuner for converting a first reception signal received by the first antenna into a first intermediate frequency signal, a second tuner for converting a second reception signal received by the second antenna into a second intermediate frequency signal, an in-phase section for aligning the first intermediate frequency signal and the second intermediate frequency signal in phase, a combiner for combining the first intermediate frequency signal and the second intermediate frequency signal which are aligned in phase by the in-phase section, a demodulator for demodulating the intermediate frequency signal, a level difference detector for detecting a difference in strength level between the first intermediate frequency signal and the second intermediate frequency signal, and a diversity operation controller for causing the demodulator to demodulate the intermediate frequency signal combined by the combiner when the level difference detected by the level difference detector is smaller than a predetermined level, and for causing the demodulator to demodulate one of the first and second intermediate frequency signals which has a possibility of occurrence of interference smaller than that of the other signal when the level difference detected by the level difference detector is not smaller than the predetermined level. When one of the first and second intermediate frequency signals having the smaller possibility of the interference occurrence is demodulated, the diversity operation controller causes at least one of the first and second tuners and the demodulator to prevent a problem caused by interference occurring in the first or second reception signal more strongly than when causing the demodulator to demodulate the intermediate frequency signal combined by the combiner.

Thus, in this aspect of the invention, the radio broadcast receiver, which is adapted to receive a radio broadcast using the in-phase combination type diversity scheme, can reduce the degradation in the quality of the received signals in a situation where the multipath interference cannot be decreased effectively due to the large strength-level difference between the reception signals of the two antennas, by performing the selection diversity scheme. In addition, when performing the in-phase combination type diversity scheme, an extra operation is not needed to prevent a problem caused by interference occurring in the reception signal, and when performing the selection diversity scheme, an appropriate operation can be conducted to prevent the problem caused by the interference occurring in the reception signal.

As mentioned above, according to the invention, the radio broadcast receiver adapted to receive a radio broadcast by the in-phase combination type diversity scheme can reduce the degradation in quality of the received signals in a situation where the multipath interference cannot be decreased effectively by the in-phase combination type diversity scheme.

DESCRIPTION OF THE PREFERRED EMBODIMENTS

Reference will now be made in detail to an exemplary embodiment of the invention.

Figure 1:
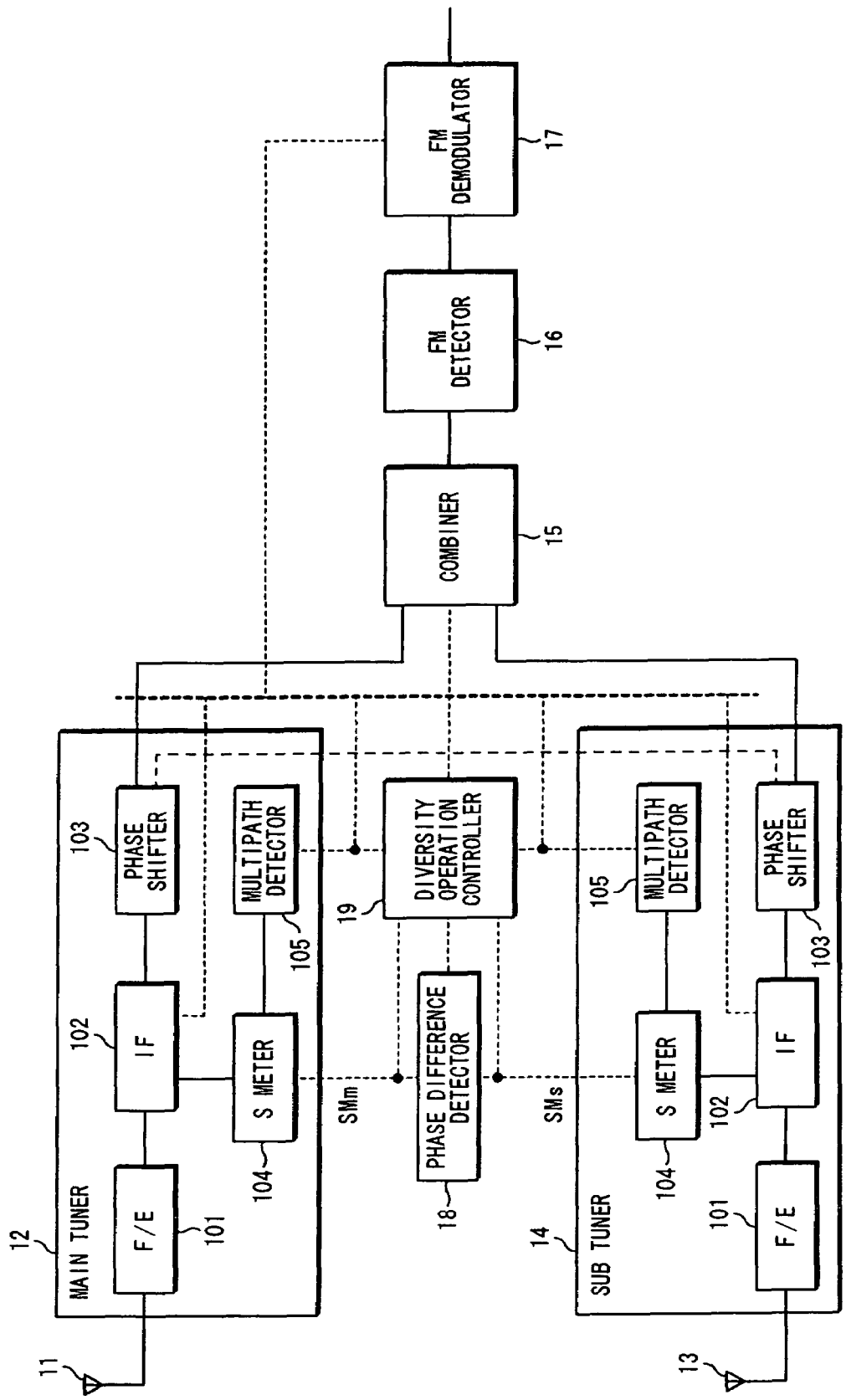
FIG. 1 is a diagram showing a configuration of a radio broadcast receiver according to one preferred embodiment of the invention.

FIG. 1 illustrates an example in which a configuration of a radio broadcast receiver of the embodiment is applied to an FM broadcast receiver. As shown in the figure, the radio broadcast receiver includes a main antenna 11, a main tuner 12 connected to the main antenna 11, a sub antenna 13, a sub tuner 14 connected to the sub antenna 13, a combiner 15, an FM detector 16, an FM demodulator 17, a phase difference detector 18, and a diversity operation controller 19.

The main tuner 12 and the sub tuner 14 have the same configuration, and respectively include a front-end section 101 for amplifying a signal supplied from the antenna connected thereto and converting it into an intermediate frequency signal, and an IF section 102 for limiting a band of the intermediate frequency signal supplied from the front-end section 101 and amplifying the intermediate frequency signal. Further, the tuners 12 and 14 each include a phase shifter 103 for adjusting a phase of the intermediate frequency signal supplied from the IF section 102 and providing it to the combiner 15 such that the intermediate frequency signal supplied from the main tuner 12 to the combiner 15 and the intermediate frequency signal supplied from the sub tuner 14 to the combiner 15 are aligned in phase. In addition, the tuners 12 and 14 each include an S meter 104 for detecting an electric field strength of the intermediate frequency signal to produce an electric-field-strength signal indicative of the detected electric field strength, and a multipath detector 105 for detecting the occurrence of the multipath based on fluctuations in the electric field strength or the like represented by the electric-field-strength signal received from the S meter 104.

The combiner 15 combines the intermediate frequency signal received from the main tuner 12 and the intermediate frequency signal received from the sub tuner 14 at a combination ratio designated by a diversity combining section, and supplies the combined signal to the FM detector 16. The FM detector 16 detects an FM signal from the intermediate frequency signal, and the FM demodulator 17 demodulates the detected FM signal into stereo sound and produces it.

Figure 2A:
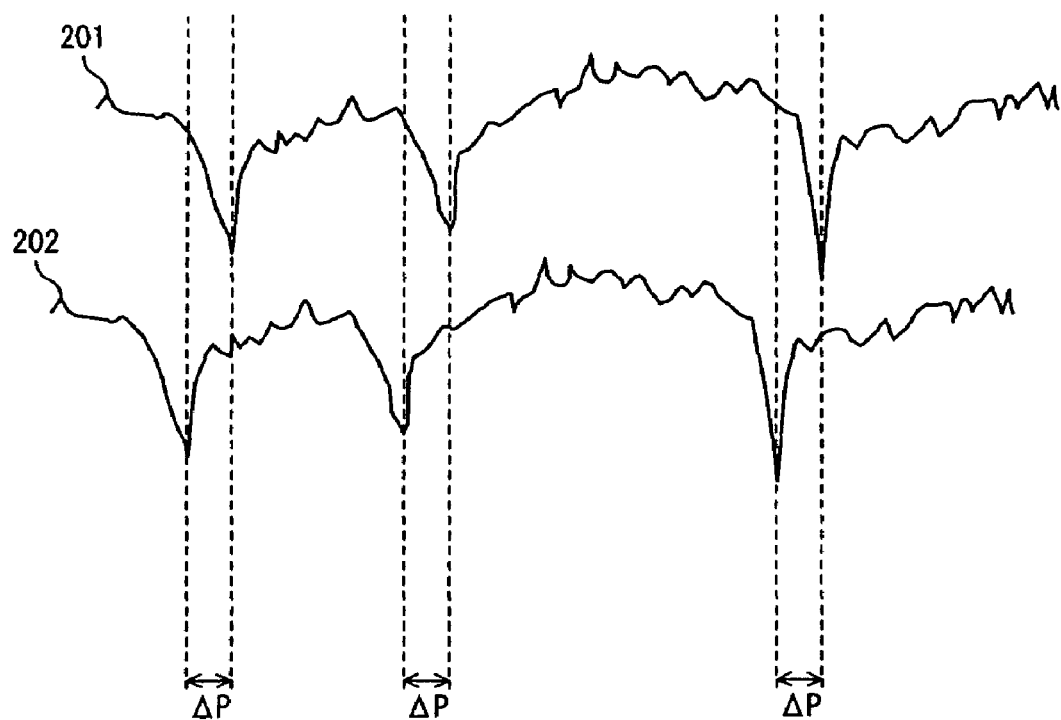
FIG. 2 illustrates examples of calculation of a phase difference and a level difference performed in the embodiment.

The phase difference detector 18 detects a phase difference between a phase Pm of the intermediate frequency signal processed by the IF section 102 of the main tuner 12 and a phase Ps of the intermediate frequency signal processed by the IF section 102 of the sub tuner 14, from an electric-field-strength signal SMm supplied from the main tuner 12 and an electric-field strength signal SMs supplied from the sub tuner 14. Such a phase difference is determined, for example, as shown in FIG. 2(a), by a phase difference AP between a peak of an electric-field-strength signal SMm 201 on a steep downslope and a peak of an electric-field-strength signal SMs 202 on another steep downslope.

The diversity operation controller 19 controls the operation of each component described above based on the electric-field-strength signals SMm and SMs supplied from the main tuner 12 and the sub tuner 14, respectively, on the phase difference detected by the phase difference detector 18, and on the occurrence of the multipath detected by the main tuner 12 and the sub tuner 14, in the following way.

Figure 3:
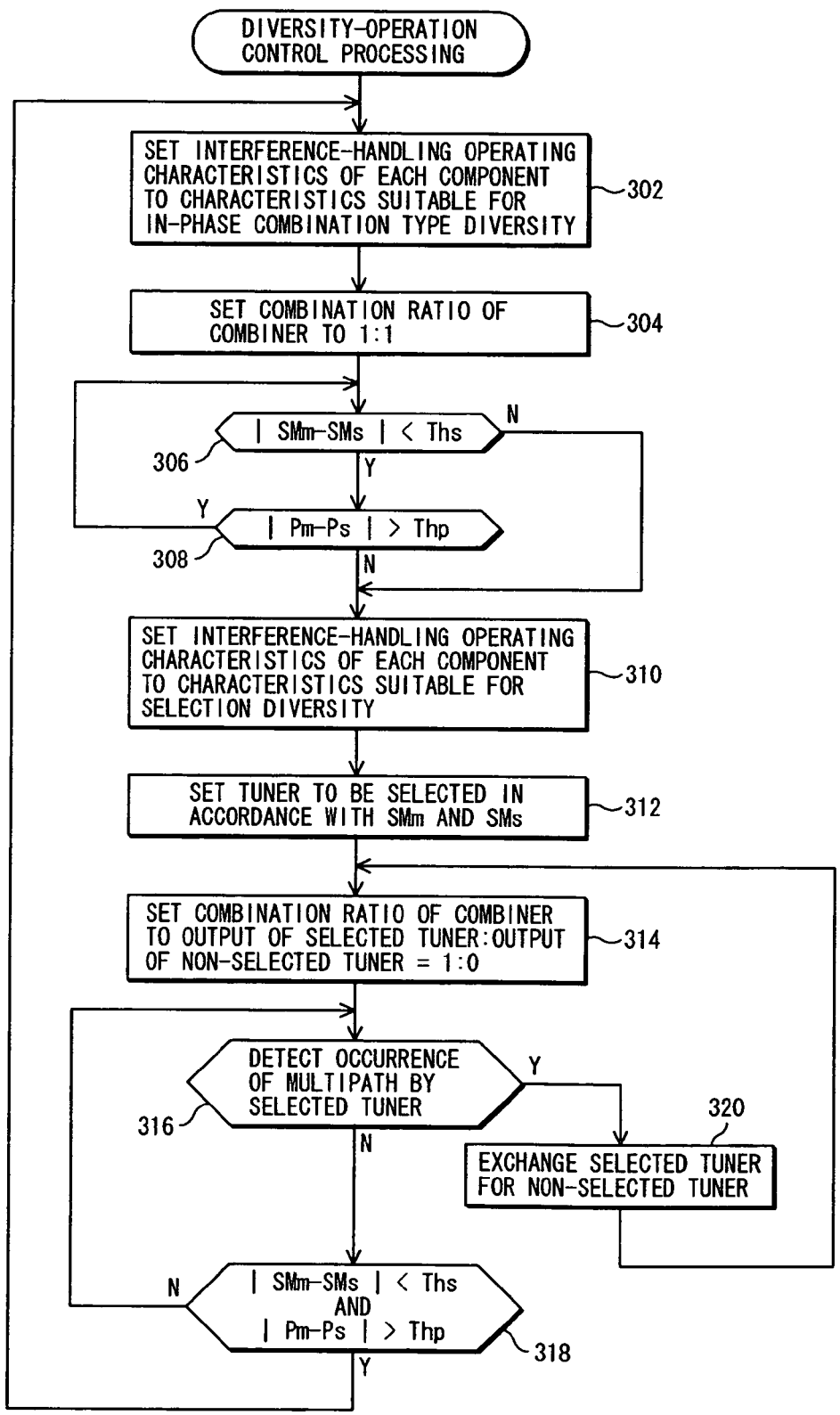
FIG. 3 is a flowchart showing diversity operation control processing according to the embodiment.

FIG. 3 illustrates steps of diversity-operation control processing to be performed by the diversity operation controller 19 for control of each component of the receiver.

As shown in the figure, in this processing, first, interference-handling operating characteristics of each component are set to characteristics suitable for the in-phase combination type diversity (step 302). Note that the interference-handling operating characteristics set will be described in detail later. Then, a combination ratio of the combiner 15 is set to the intermediate frequency signal supplied from the main tuner 12: the intermediate frequency signal supplied from the sub tuner 14=1:1 (step 304). At this time, the radio broadcast receiver performs the in-phase combination type diversity reception.

Then, it is determined whether or not an absolute value of a difference between the electric-field-strength signal SMm supplied from the main tuner 12 and the electric-field-strength signal SMs supplied from the sub tuner 14 is less than a predetermined threshold value Ths (step 306). If not, that is, if the absolute value is not less than the threshold value Ths, the operation proceeds to step 310. On the other hand, if yes, that is, if the absolute value is less than the threshold value Ths, it is further determined whether or not the phase difference detected by the phase difference detector 18 between the phase Pm of the intermediate frequency signal processed by the IF section 102 of the main tuner 12 and the phase Ps of the intermediate frequency signal processed by the IF section 102 of the sub tuner 14 is larger than a predetermined threshold value Thp. If yes, that is, if the difference is larger than the threshold value Thp, the operation returns to step 306. On the other hand, if no, that is, if the difference is not larger than the predetermined threshold value Thp, the operation proceeds to step 310.

Figure 2B:
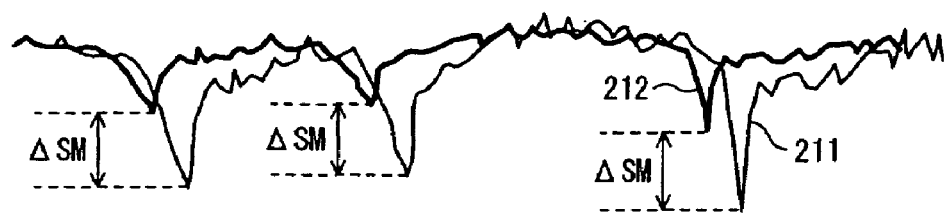

The difference between the electric-field-strength signal SMm supplied from the main tuner 12 and the electric-field-strength signal SMs supplied from the sub tuner 14 is determined at step 306, for example, as shown in FIG. 2(b), by a difference in level $\Delta$SM between a peak of an electric-field-strength signal SMm 211 on the steep downslope and a peak of an electric-field-strength signal SMs 212 on the steep downslope.

At step 310, the interference-handling operating characteristics of each component are set to characteristics suitable for the selection diversity. If the electric-field-strength signal SMm supplied from the main tuner 12 is larger than the electric-field-strength signal SMs supplied from the sub tuner 14, the main tuner 12 is set as a tuner to be selected (step 312). If not, the sub tuner 14 is set as the tuner to be selected (step 312). Then, the combination ratio of the combiner 15 is set to the intermediate frequency signal supplied from the selected tuner: the intermediate frequency signal supplied from the other tuner=1:0 (step 314).

It is monitored by the selected tuner whether the multipath occurs or not (step 316). If not, it is also checked whether or not the absolute value of the difference between the electric-field-strength signal SMm supplied from the main tuner 12 and the electric-field-strength signal SMs supplied from the sub tuner 14 is less than the predetermined threshold value Ths, and whether or not the phase difference between the phase Pm of the intermediate frequency signal processed by the IF section 102 of the main tuner 12 and the phase Ps of the intermediate frequency signal processed by the IF section 102 of the sub tuner 14 is larger than the predetermined threshold value Thp (step 318).

If occurrence of the multipath is detected by the selected tuner (step 316), one of the main tuner 12 and the sub tuner 14 which is not currently set as the selected tuner is set as a tuner to be newly selected (step 320). At step 314, the combination ratio of the combiner 15 is again set to the intermediate frequency signal from the selected tuner newly set: the intermediate frequency signal from the other tuner=1:0. Then, the operation returns to the monitoring steps 316 and 318. At this time, the radio broadcast receiver performs the selection diversity.

On the other hand, if it is determined at step 318 that the absolute value of the difference between the electric-field-strength signal SMm supplied from the main tuner 12 and the electric-field-strength signal SMs supplied from the sub tuner 14 is less than the predetermined threshold value Ths, and that the phase difference between the phase Pm of the intermediate frequency signal processed by the IF section 102 of the main tuner 12 and the phase Ps of the intermediate frequency signal processed by the IF section 102 of the sub tuner 14 is larger than the predetermined threshold value Thp, the operation returns to step 302. Thus, the radio broadcast receiver performs again the in-phase combination type diversity reception.

Figure 4A:
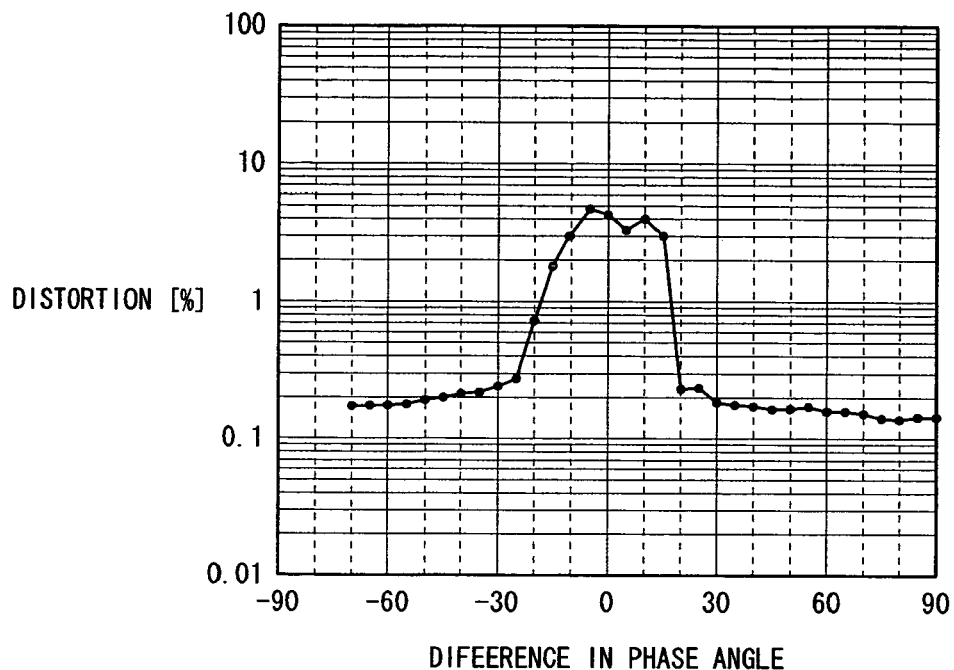
FIG. 4 is a diagram showing characteristics of in-phase combination type diversity.
Figure 4B:
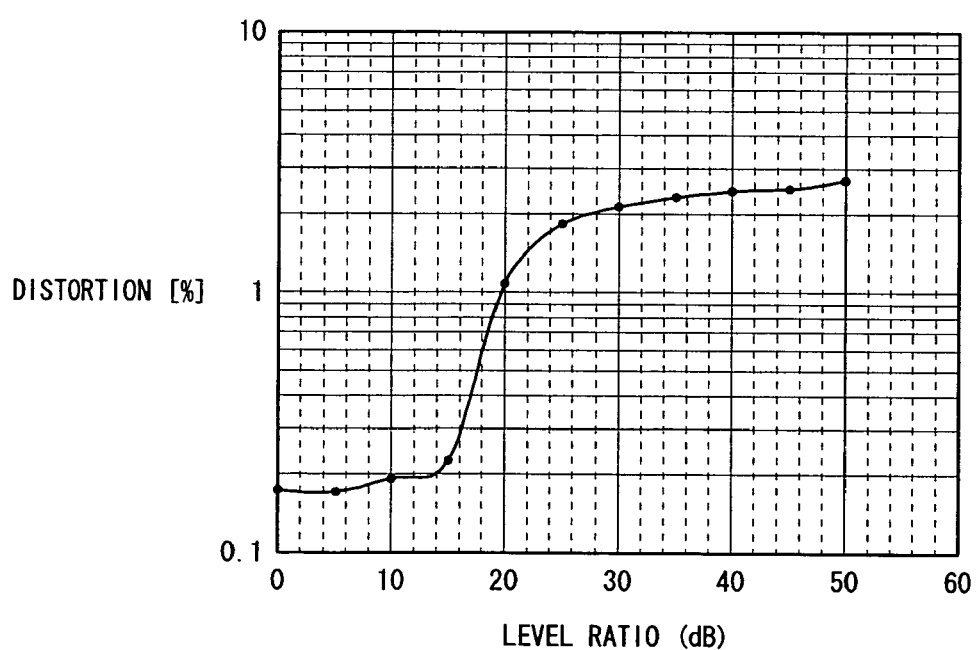

As described above, in the radio broadcast receiver of the embodiment, when the level difference between the reception signal received by the main antenna 11 and the reception signal received by the sub antenna 13 is less than the predetermined threshold value, and when the phase difference therebetween exceeds another predetermined threshold value, the in-phase combination type diversity is carried out. In other cases, the selection diversity is carried out. As can be seen from FIGS. 4(a) and 4(b), when the level difference between the reception signal of the main antenna 11 and the reception signal of the sub antenna 13 is large, or when the phase difference between the reception signal of the main antenna 11 and the reception signal of the sub antenna 13 is small, the quality of the reception signal received by the in-phase combination type diversity may be largely degraded. In this case, the selection diversity can often be carried out to reduce the degradation in quality of the diversity-received signals more than the in-phase combination type diversity. According to the present embodiment, the radio broadcast receiver adapted to receive the radio broadcast by the in-phase combination type diversity can prevent degradation in quality of the signals received in a situation where the multipath interference may not be effectively reduced by the in-phase combination type diversity scheme.

Now, the setting of the interference-handling operating characteristics of each component at steps 302 and 310 will be described in more detail.

The interference-handling operating characteristics set in these steps include a sensitivity characteristic of multipath detection by the multipath detector 105, a band-limiting characteristic of the intermediate frequency signal by the IF section 102, a stereo separation characteristic and a high-cut characteristic of the FM demodulator 107, and the like.

At step 302, the interference-handling operating characteristics are set to the suitable characteristics for the in-phase combination type diversity, while, at step 310, the interference-handling operating characteristics are set to the suitable characteristics for the selection diversity. Additionally, at step 310, the interference-handling operating characteristics are set which can reduce the occurrence of the problem caused by interference occurring in the reception signal more strongly and positively than the interference-handling operating characteristics set at step 302.

More specifically, for example, when setting the interference-handling operating characteristics suitable for the selection diversity at step 310, the multipath detection sensitivity of the multipath detector 105 is enhanced, thereby facilitating the detection of the multipath, as compared to when setting the interference-handling operating characteristics suitable for the in-phase combination type diversity at step 302. In addition, the bandwidth of the intermediate frequency signal of the IF section 102 is narrowed to prevent more the mixing of noise, and the stereo separation characteristic and high-cut characteristic of the FM demodulator 17 are controlled and set so as to decrease more stereo separation with respect to the same level of the input signal and to attenuate a high frequency band more than in the case of setting the operating characteristics at step 302. When performing the in-phase combination type diversity or selection diversity, the FM demodulator 17 may lessen the stereo separation in response to the occurrence of the multipath to output monaural sound, and attenuate the high frequency band more by changing the high-cut characteristics.

It should be noted that although the application to the FM broadcast receiver is taken as an example in the present embodiment, the technology of the embodiment for switching between the in-phase combination type diversity and the selection diversity according to the level or phase difference between a plurality of reception signals received by a plurality of antennas may be applied in the same way to any radio broadcast receivers that receive any other broadcasts.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A radio broadcast receiver for performing diversity reception of a radio broadcast and demodulating a diversity-received signal of the broadcast, the receiver comprising:
   a first antenna;
   a second antenna;
   a phase difference detector for detecting a difference in phase between a first reception signal received by the first antenna and a second reception signal received by the second antenna;
   a first diversity reception section for aligning the first reception signal and the second reception signal in phase and combining said first and second signals into a diversity-received signal;

a second diversity reception section for selecting as the diversity-received signal, one reception signal in a better reception condition from the first and second reception signals;

a diversity operation controller for activating the first diversity reception section when the phase difference detected by the phase difference detector is larger than a predetermined level, and for activating the second diversity reception section when the phase difference detected by the phase difference detector is not larger than the predetermined level; and a demodulator for demodulating the diversity-received signal supplied from the first diversity reception section when the first diversity reception section is activated by the diversity operation controller, and for demodulating the diversity-received signal supplied from the second diversity reception section when the second diversity reception section is activated by the diversity operation controller.

2. The radio broadcast receiver according to claim 1, wherein the receiver is adapted to receive an FM broadcast.

3. A radio broadcast receiver for performing diversity reception of a radio broadcast and demodulating a diversity-received signal of the broadcast, the receiver comprising:

a first antenna;

a second antenna;

a level difference detector for detecting a difference in strength level between a first reception signal received by the first antenna and a second reception signal received by the second antenna;

a first diversity reception section for aligning the first reception signal and the second reception signal in phase and combining said first and second signals into a diversity-received signal;

a second diversity reception section for selecting as the diversity-received signal, one signal in a better reception condition from the first and second reception signals;

a diversity operation controller for activating the first diversity reception section when the level difference detected by the level difference detector is smaller than a predetermined level, and for activating the second diversity reception section when the level difference detected by the level difference detector is not smaller than the predetermined level; and a demodulator for demodulating the diversity-received signal supplied from the first diversity reception section when the first diversity reception section is activated by the diversity operation controller, and for demodulating the diversity-received signal supplied from the second diversity reception section when the second diversity reception section is activated by the diversity operation controller.

4. The radio broadcast receiver according to claim 3, wherein the receiver is adapted to receive an FM broadcast.

5. A radio broadcast receiver for performing diversity reception of a radio broadcast and demodulating a diversity-received signal of the broadcast, the receiver comprising:

a first antenna;

a second antenna;

a first tuner for converting a first reception signal received by the first antenna into a first intermediate frequency signal;

a second tuner for converting a second reception signal received by the second antenna into a second intermediate frequency signal;

an in-phase section for aligning the first intermediate frequency signal and the second intermediate frequency signal in phase;

a combiner for combining the first intermediate frequency signal and the second intermediate frequency signal which are aligned in phase by the in-phase section;

a demodulator for demodulating the intermediate frequency signal;

a phase difference detector for detecting a difference in phase between the first intermediate frequency signal and the second intermediate frequency signal; and a diversity operation controller for causing the demodulator to demodulate the intermediate frequency signal combined by the combiner when the phase difference detected by the phase difference detector is larger than a predetermined level, and for causing the demodulator to demodulate one of the first and second intermediate frequency signals when the phase difference detected by the phase difference detector is not larger than the predetermined level, said demodulated one of the first and second intermediate frequency signals having a possibility of occurrence of interference smaller than that of the other, wherein, when said one of the first and second intermediate frequency signals having the smaller possibility of the interference occurrence is demodulated, said diversity operation controller causes at least one of the first and second tuners and the demodulator to prevent a problem caused by interference occurring in the first or second reception signal more strongly than when causing the demodulator to demodulate the intermediate frequency signal combined by the combiner.

6. The radio broadcast receiver according to claim 5, wherein the receiver is adapted to receive an FM broadcast.

7. The radio broadcast receiver according to claim 6, wherein, when said one of the first and second intermediate frequency signals having the smaller possibility of the interference occurrence is demodulated, the diversity operation controller controls multipath detection sensitivity of the first and second tuners.

8. The radio broadcast receiver according to claim 6, wherein, when said one of the first and second intermediate frequency signals having the smaller possibility of the interference occurrence is demodulated, the diversity operation controller controls intermediate frequency bands of the first and second tuners.

9. The radio broadcast receiver according to claim 6, wherein, when said one of the first and second intermediate frequency signals having the smaller possibility of the interference occurrence is demodulated, the diversity operation controller controls a stereo separation characteristic and a high-cut characteristic of the demodulator.

10. A radio broadcast receiver for performing diversity reception of a radio broadcast and demodulating a diversity-received signal of the broadcast, the receiver comprising:

a first antenna;

a second antenna;

a first tuner for converting a first reception signal received by the first antenna into a first intermediate frequency signal;

a second tuner for converting a second reception signal received by the second antenna into a second intermediate frequency signal;

an in-phase section for aligning the first intermediate frequency signal and the second intermediate frequency signal in phase;

a combiner for combining the first intermediate frequency signal and the second intermediate frequency signal which are aligned in phase by the in-phase section;

a demodulator for demodulating the intermediate frequency signal;

a level difference detector for detecting a difference in strength level between the first intermediate frequency signal and the second intermediate frequency signal; and a diversity operation controller for causing the demodulator to demodulate the intermediate frequency signal combined by the combiner when the level difference detected by the level difference detector is smaller than a predetermined level, and for causing the demodulator to demodulate one of the first and second intermediate frequency signals when the level difference detected by the level difference detector is not smaller than the predetermined level, said one of the first and second intermediate frequency signals demodulated having a possibility of occurrence of interference smaller than that of the other, wherein, when said one of the first and second intermediate frequency signals having the smaller possibility of the interference occurrence is demodulated, said diversity operation controller causes at least one of the first and second tuners and the demodulator to prevent a problem caused by interference occurring in the first or second reception signal more strongly than when causing the demodulator to demodulate the intermediate frequency signal combined by the combiner.

11. The radio broadcast receiver according to claim 10, wherein the receiver is adapted to receive an FM broadcast.

12. The radio broadcast receiver according to claim 11, wherein, when said one of the first and second intermediate frequency signals having the smaller possibility of the interference occurrence is demodulated, the diversity operation controller controls multipath detection sensitivity of the first and second tuners.

13. The radio broadcast receiver according to claim 11, wherein, when said one of the first and second intermediate frequency signals having the smaller possibility of the interference occurrence is demodulated, the diversity operation controller controls intermediate frequency bands of the first and second tuners.

14. The radio broadcast receiver according to claim 11, wherein, when said one of the first and second intermediate frequency signals having the smaller possibility of the interference occurrence is demodulated, the diversity operation controller controls a stereo separation characteristic and a high-cut characteristic of the demodulator.

\* \* \* \* \*